United States Patent
Vogl et al.

(10) Patent No.: US 10,654,559 B2
(45) Date of Patent: May 19, 2020

(54) PITCH CONTROL DEVICE FOR A DUCTED TAIL ROTOR OF A ROTORCRAFT

(71) Applicant: AIRBUS HELICOPTERS DEUTSCHLAND GMBH, Donauworth (DE)

(72) Inventors: Julius Vogl, Gersthofen (DE); Gerald Kuntze-Fechner, Gmund am Tegernsee (DE); Victoria Otto, Aix en Provence (FR)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 191 days.

(21) Appl. No.: 15/906,090

(22) Filed: Feb. 27, 2018

(65) Prior Publication Data

US 2018/0244368 A1    Aug. 30, 2018

(30) Foreign Application Priority Data

Feb. 27, 2017  (EP) .................................. 17400007

(51) Int. Cl.
*B64C 11/32* (2006.01)
*B64C 27/605* (2006.01)
(Continued)

(52) U.S. Cl.
CPC ............ *B64C 11/32* (2013.01); *B64C 27/605* (2013.01); *B64C 27/72* (2013.01); *B64C 27/78* (2013.01);
(Continued)

(58) Field of Classification Search
CPC ............... B64C 11/30–36; B64C 27/78; B64C 2027/8254; F01D 17/16; F01D 17/162; F01D 17/165
See application file for complete search history.

(56) References Cited

U.S. PATENT DOCUMENTS 2,396,590 A * 3/1946 McDougal .............. B64C 27/54
    416/115
3,594,097 A * 7/1971 Mouille .................. B64C 27/82
    416/104
(Continued)

FOREIGN PATENT DOCUMENTS

DE    102014206639 A1 * 10/2015
EP       0680871 A1    11/1995
(Continued)

OTHER PUBLICATIONS

Notice of Preliminary Rejection for Korean Application No. 10-2017-0176081, dated Apr. 12, 2019, 3 Pages.
(Continued)

*Primary Examiner* — Michael Lebentritt
*Assistant Examiner* — Topaz L. Elliott
(74) *Attorney, Agent, or Firm* — Brooks Kushman P.C.

(57) ABSTRACT

A pitch control device for a ducted tail rotor of a rotorcraft. The pitch control device comprises a control input member with a disc-shaped central component and at least two connecting arms that extend radially from the disc-shaped central component, wherein the disc-shaped central component is provided for being mounted to an associated pitch control shaft of the ducted tail rotor, and a control transfer member with a ring-shaped connector and at least two push rods that extend axially from the ring-shaped connector, wherein each one of the at least two push rods is provided for being coupled to an associated pitch lever of a rotor blade of the ducted tail rotor.

20 Claims, 5 Drawing Sheets

(51) Int. Cl.
*B64C 27/78* (2006.01)
*B64C 27/72* (2006.01)
*B64C 27/82* (2006.01)

(52) U.S. Cl.
CPC ...... *B64C 27/82* (2013.01); *B64C 2027/8254* (2013.01); *Y02T 50/34* (2013.01)

(56) References Cited

U.S. PATENT DOCUMENTS

| | | | | |
|---|---|---|---|---|
| 3,637,321 | A | * | 1/1972 | Nekrasov ............... B64C 27/32 416/123 |
| 4,281,966 | A | * | 8/1981 | Duret ................. B29D 99/0025 416/134 A |
| 4,626,172 | A | * | 12/1986 | Mouille ............. B29D 99/0025 416/134 A |
| 4,626,173 | A | | 12/1986 | Mouille et al. |
| 4,809,931 | A | | 3/1989 | Mouille et al. |
| 5,067,875 | A | * | 11/1991 | Hunter ................. B64C 27/605 416/114 |
| 5,306,119 | A | | 4/1994 | Bandoh et al. |
| 5,383,767 | A | * | 1/1995 | Aubry ..................... B64C 27/45 416/134 A |
| 5,415,525 | A | | 5/1995 | Desjardins et al. |
| 5,478,204 | A | | 12/1995 | Desjardins et al. |
| 5,498,129 | A | | 3/1996 | Dequin et al. |
| 5,566,907 | A | | 10/1996 | Marze et al. |
| 5,810,562 | A | * | 9/1998 | Byrnes .................. B64C 27/605 416/114 |
| 9,227,723 | B2 | * | 1/2016 | Balk ..................... B64C 11/306 |
| 9,963,589 | B2 | * | 5/2018 | Nagano ...................... C08J 5/24 |
| 2014/0070051 | A1 | | 3/2014 | Kreitmair-Steck et al. |
| 2016/0059960 | A1 | * | 3/2016 | Fearn .................... B64C 27/022 244/17.11 |

FOREIGN PATENT DOCUMENTS

| | | |
|---|---|---|
| EP | 0680875 A1 | 11/1995 |
| KR | 20140032908 A | 3/2014 |
| WO | 9302918 A1 | 2/1993 |
| WO | 2007107521 A1 | 9/2007 |

OTHER PUBLICATIONS

European Search Report for European Application No. EP17400007, Completed by the European Patent Office, dated May 4, 2017, 9 pages.
Canadian Office Action for Application No. 2,978,820, dated Aug. 29, 2018, 4 pages.

* cited by examiner

PITCH CONTROL DEVICE FOR A DUCTED TAIL ROTOR OF A ROTORCRAFT

CROSS-REFERENCE TO RELATED APPLICATIONS

This application claims priority to European patent application No. EP 17400007.5 filed on Feb. 27, 2017, the disclosure of which is incorporated in its entirety by reference herein.

BACKGROUND OF THE INVENTION

(1) Field of the Invention

The invention is related to a pitch control device for a ducted tail rotor of a rotorcraft.

(2) Description of Related Art

The document U.S. Pat. No. 4,809,931 describes a rotorcraft with a main rotor and a counter-torque rotor that is positioned at a tail boom of the rotorcraft. The counter-torque rotor is rotatably arranged within a transverse duct located at a duct-type portion of the tail boom and, thus, embodied as a ducted tail rotor in the form of a Fenestron® tail rotor. This duct-type portion is provided with a shroud that defines the transverse duct. However, as such a counter-torque rotor and, more specifically, structure and arrangement of a ducted tail rotor in general, as well as suitable means for rotationally driving it, are well known by the skilled person, a more detailed description thereof is omitted for brevity and conciseness.

Beyond that, the documents U.S. Pat. Nos. 3,594,097, 4,626,172, 4,626,173, 5,306,119, and 5,383,767 describe suitable pitch control devices for controlling collective pitch of corresponding rotor blades of a ducted tail rotor. More specifically, these pitch control devices respectively include a hub that consists of several components including, as main components, a hub body, a splined flange to which the hub is mounted, and a pitch control member, which is also referred to as the "control spider". The hub is provided for suspension of the corresponding rotor blades and connection of these rotor blades to an associated tail gearbox that drives the ducted tail rotor. The rotor blades must be supported along their blade axes to enable a rotation thereof around the blade axes and, thus, pitch angle control of the rotor blades.

The document U.S. Pat. No. 5,415,525 describes a helicopter having a tail cone extending rearward from a cabin. A tail rotor is supported in a laterally directed duct to produce a variable thrust force by rotating pitched blades, around an axis of rotation. In a rotor hub with regularly spaces rotor arms, are provided tie bars. Each tie bar provides axial force and torsional continuity between the hub and a pitch shaft. An upper thick flange is connected by multiple bolted attachments to a corresponding mounting flange, supported on a pitch beam. The pitch beam includes four arms extending radially from the rotor axis, also with regularly spaces.

The document U.S. Pat. No. 5,478,204 describes a helicopter having a tail rotor hub. In the hub located at the inboard end of each pitch shaft is a pitch arm extending radially inward toward the hub and laterally outward a short distance from the pitch axis. Each pitch arm has a spherical surface over which a spherical bearing is fitted. Each pitch arm is seated within a cylindrical recess at the inner end of the pitch shaft and is held in position within the recess by a pitch arm ring nut having external screw threads engaged with internal threads on the pitch shaft.

The document WO2007107521 describes a bolted joint for connecting load—transferring structural parts on an aircraft. The bolted joint comprises a slotted sleeve, a washer and a nut. The bolt with the sleeve respectively passes through structural parts, and is secured by the washer and the nut. The structural parts are elements of a fork. One structural part consists of a fiber composite.

In all of these pitch control devices, the control spider is separated into two parts for accessibility and assembling reasons: a control spider ring, which serves as control transfer member, and a center plate, which serves as control input member. The center plate is usually used for connection to a respective tail rotor actuator after installation to a given rotorcraft.

The control spider in combination with the center plate must be as stiff as possible in order to guarantee a required controllability and control range despite possible deformations under loading. Consequently, respective push rods provided at the control spider ring must be as strong and stiff as possible in push and pull direction.

Furthermore, due to a high rotational speed of the ducted tail rotor in operation, the control spider ring needs to be centered at the center plate. This is usually realized by means of a step provided at an outer circumference of the center plate, which is in contact with the control spider ring. In other words, the control spider ring is usually embodied in a cup-shaped form with a bottom section that is provided with a cut-out portion for accommodation of the center plate.

Nevertheless, as soon as wear between the center plate and the control spider ring exceeds a predetermined limit of approximately 0.1 mm, the center plate and the control spider ring must be replaced. Furthermore, the center plate needs to be centered with respect to a control spider actuator, where similar principles with respect to wear are applied.

In operation, pitch angle control as such is performed by means of the control spider, which translates vertical strikes of the control spider actuator, i. e. strikes in a direction that is perpendicular to a respective rotor axis, into rotation of the rotor blades. More specifically, a respective vertical strike of the control spider actuator can be transferred into rotation of the rotor blades by providing a lever arm between the control spider and the rotor blades, which are supported at the hub body by associated bearings.

The control spider creates a comparatively stiff connection from the control spider actuator to the rotor blades whilst keeping all components below it, e. g. blade bolts, accessible for inspection in order to ensure a required controllability of the ducted tail rotor. However, the connection of a given rotor blade to the control spider via the lever arm is subject to several distinct manufacturing tolerances. These manufacturing tolerances respectively depend on an exact position and length of each lever arm, of the rotor blades towards each other in the hub body, and of the control spider itself.

In current designs, maximum manufacturing tolerances are considered. In order to deal with these maximum manufacturing tolerances, frequently an oblong bushing is in use in the control spider, wherein a spherical joint of the lever arms can move laterally, or vice versa. This free movement results in vibrations, different characteristics in respective neutral pitch positions and imperfect controllability even though respective control variations are only in a small range of control.

In addition, each movement of the control spider in relation to the rotor blades results in wear in either the oblong bushing or the spherical joint. For reducing this wear to an acceptable extend, hardened expensive materials need to be used for realization of the corresponding components of the pitch control device. This requirement together with the above described stiffness requirements, however, lead to pitch control devices that are usually comparatively heavy as a result of respectively selected materials and implementations. Furthermore, a separation of the conventional pitch control device in a comparatively great number of distinct components is required due to underlying assembling processes. Moreover, the required centering requires replacement of the complete conventional pitch control device, if the respective limits are exceeded.

BRIEF SUMMARY OF THE INVENTION

It is, therefore, an object of the present invention to provide a new pitch control device with a simplified structure and reduced weight.

This object is solved by a pitch control device for a ducted tail rotor of a rotorcraft, the pitch control device comprising the features of claim 1.

More specifically, according to the invention a pitch control device for a ducted tail rotor of a rotorcraft comprises a control input member and a control transfer member. The control input member comprises a disc-shaped central component and at least two connecting arms that extend radially from the disc-shaped central component. The disc-shaped central component is provided for being mounted to an associated pitch control shaft of the ducted tail rotor. The control transfer member comprises a ring-shaped connector and at least two push rods that extend axially from the ring-shaped connector. Each one of the at least two push rods is provided for being coupled to an associated pitch lever of a rotor blade of the ducted tail rotor.

According to one aspect, an underlying outer diameter of the control input member is predefined such that the control transfer member can at least essentially be implemented as a narrow ring that merely connects the connecting arms of the control input member and, likewise, the push rods of the control transfer member itself with each other. Preferably, the control transfer member is implemented by means of a metallic ring.

The control input member is preferably implemented as a composite sandwich component and, thus, defines a comparatively stiff basis of the pitch control device. Preferentially, the control input member, or parts thereof, is(are) implemented using composite material, preferably carbon fiber reinforced polymers. However, other fiber reinforced polymers, such as e. g. glass fiber reinforced polymers or Aramid fiber reinforced polymers, may likewise or simultaneously be used.

According to one aspect, the control input member is provided with a foam core that exhibits an increasing thickness from an outer radial end of the connecting arms of the control input member towards a rotational center of its disc-shaped central component on the basis of an underlying moment distribution, which linearly increases from the outer radial end of the connecting arms towards the rotational center of the disc-shaped central component. Thus, the composite sandwich component realizes a design that is adaptable to individual Fenestron® stiffness requirements, while obtaining a design that is as lightweight as possible. A further advantage of this design is that large openings resp. free spaces between connecting arms that are adjacent in peripheral direction of the disc-shaped central component are realizable, which simplifies necessary inspections of components that are installed below the disc-shaped central component, e. g. blade bolts and tension torsion-(TT-) straps, and which would otherwise be covered by the disc-shaped central component.

However, as the control input member preferably comprises carbon fiber reinforced polymers and as the control transfer member and a corresponding pitch control shaft are preferably metallic, a suitable isolation between the control input member and the control transfer member as well as between the control input member and the pitch control shaft is required. Such a suitable isolation is, according to one aspect, realized by means of bushings that are bonded to the control input member, i. e. to outer radial ends of the connecting arms of the control input member as well as to a central opening of the disc-shaped central component, using a suitable adhesive, which builds a barrier between composite and metal material. The bushings in turn are preferably used as centering elements for centering the control transfer member to the control input member and the control input member to the pitch control shaft. Therefore, advantageously only the bushings need to be replaced if underlying wear limits are exceeded. Preferably, for bonding of the bushings at a respective exact position a suitable tooling is used.

According to one aspect, stud bolts are used for releasably connecting the control input member, i. e. its connecting arms, to the control transfer member, i. e. its ring-shaped connector. This reduces a respectively required assembling effort, as such stud bolts are suitable to hold the control input member in position on the control transfer member during assembly on the rotorcraft.

As a result of the above described configuration, a pitch control device with reduced manufacturing costs and a comparatively light weight can be obtained, which is easily adaptable to respectively underlying stiffness requirements. Furthermore, assembling of the pitch control device on a given rotorcraft can be simplified. Moreover, upon occurrence of excessive wear, e. g. if underlying centering tolerances are exceeded, only the bushings need to be replaced. In addition, large openings in the control input member allow for an easy inspection of components that are installed below the disc-shaped central component, e. g. blade bolts and TT-straps.

According to a preferred embodiment, the disc-shaped central component and the at least two connecting arms define a spider-shaped structure.

According to a further preferred embodiment, the control input member is rigidly attached to the control transfer member, preferably in a releasable manner.

According to a further preferred embodiment, the control input member is at least partly formed as a sandwich component with a foam core that is embedded into at least one fiber-reinforced fabric layer.

According to a further preferred embodiment, the disc-shaped central component of the control input member is equipped with a plastic mounting component that is provided for being mounted to the associated pitch control shaft of the ducted tail rotor.

According to a further preferred embodiment, the at least two connecting arms of the control input member are rigidly attached to the ring-shaped connector of the control transfer member.

According to a further preferred embodiment, the at least two connecting arms are rigidly attached to the ring-shaped connector by means of associated fixation members.

According to a further preferred embodiment, the control input member comprises a composite material, and the control transfer member comprises metal.

According to a further preferred embodiment, the composite material comprises carbon fiber reinforced polymer, and the metal comprises aluminum.

According to a further preferred embodiment, a bushing is provided as interface between each one of the at least two connecting arms and the ring-shaped connector.

According to a further preferred embodiment, each bushing is bonded to one of the at least two connecting arms by means of an associated adhesive layer.

According to a further preferred embodiment, each bushing comprises a flange that centers the one of the at least two connecting arms at the ring-shaped connector.

According to a further preferred embodiment, each bushing accommodates an associated stud bolt that is anchored at the ring-shaped connector.

According to a further preferred embodiment, each stud bolt is anchored at the ring-shaped connector in a threaded insert that is mounted to an associated accommodation provided in the ring-shaped connector.

According to a further preferred embodiment, each stud bolt is accommodated in an associated opening provided in the one of the at least two connecting arms and fixed at the one of the at least two connecting arms by means of a nut.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
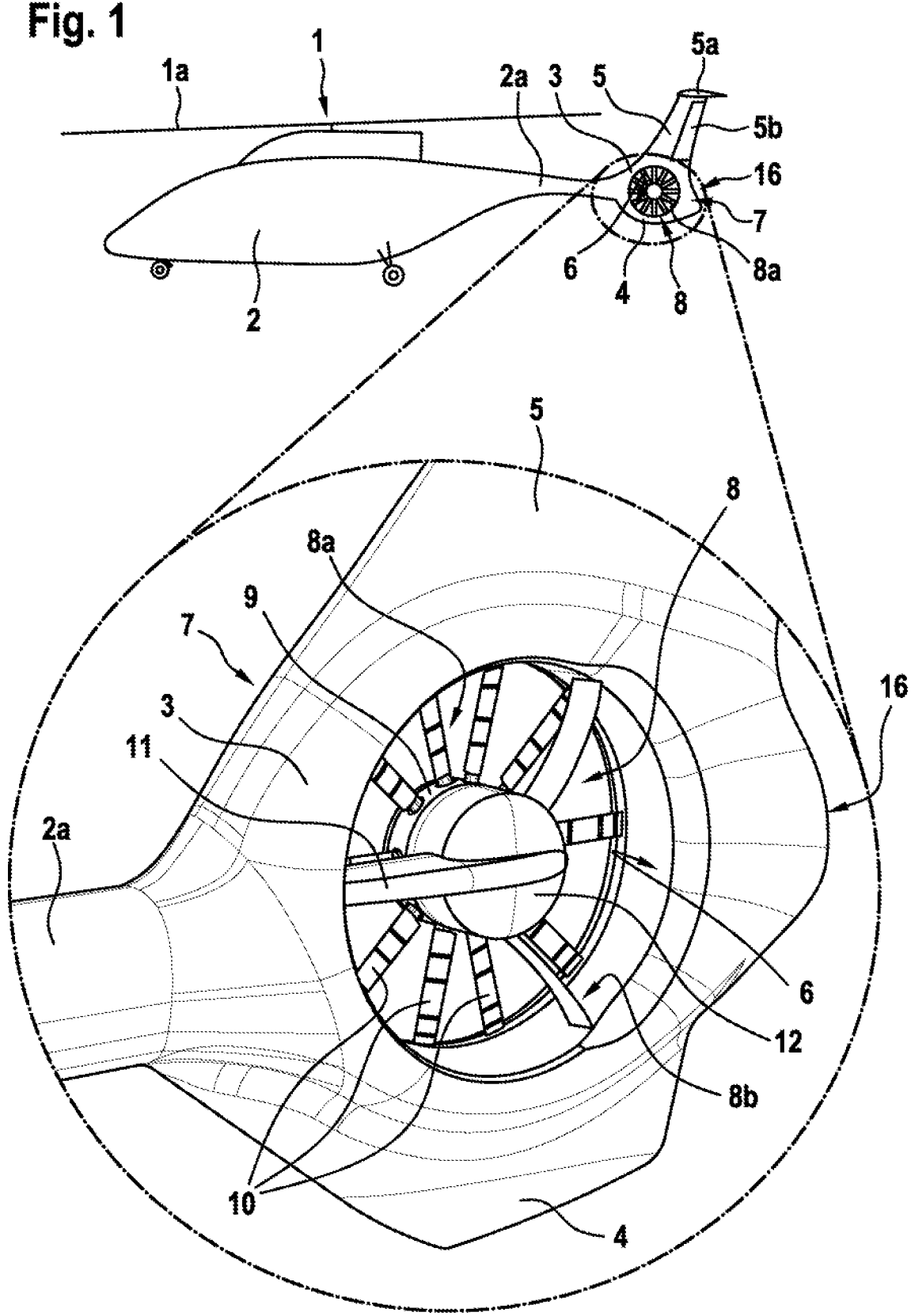
FIG. 1 shows a side view of a rotorcraft with a ducted tail rotor according to the invention, and an enlarged perspective view of the ducted tail rotor.

FIG. 1 shows a rotorcraft 1 with a fuselage 2 that comprises a tail boom 2a. The rotorcraft 1 is illustratively embodied, and therefore hereinafter for simplicity also referred to, as a helicopter.

The helicopter 1 comprises at least one main rotor 1a configured to provide lift and forward thrust during operation, and at least one counter-torque device 8 configured to provide counter-torque during operation, i.e. to counter the torque created by rotation of the at least one main rotor 1a for purposes of balancing the helicopter 1 in terms of yaw. It should, however, be noted that the present invention is not limited to helicopters and may likewise be applied to other aircrafts that are equipped with rotary wings and at least one counter-torque device according to the present invention.

The at least one counter-torque device 8 is illustratively provided at an aft section 1b of the tail boom 2a, which preferably comprises at least one duct-type portion 7. By way of example, the aft section 1b further comprises a bumper 4 and a fin 5 in the form of a T-tail having a tail wing 5a and a rudder 5b. The tail wing 5a is preferably adjustable in its inclination and can overtake the functioning of a horizontal stabilizer. Alternatively, or in addition, the helicopter 1 is provided with a suitable horizontal stabilizer. The rudder 5b is preferably adapted to provide for enhanced directional control of the helicopter 1 and can be deflected to large angles to reduce a given lateral drag of the fin 5 in sideward flight.

However, it should be noted that the T-tail configuration of the fin 5 and the rudder 5b, as well as the horizontal stabilizer, are merely described for illustrating one exemplary embodiment of the present invention and not for limiting the invention accordingly. Instead, the present invention as described hereinafter can likewise be applied to any duct-type portion of a rotorcraft, independent on whether this duct-type portion is provided with a T-tail fin or an otherwise configured fin, with or without a rudder and with or without a horizontal stabilizer.

Preferably, the duct-type portion 7 is provided with a shroud 3 that defines at least one transverse duct 6 having preferentially an at least approximately circular or annular cross section, wherein at least one counter-torque rotor 8a is arranged rotatably. The at least one transverse duct 6 illustratively extends through the shroud 3. Furthermore, at least one counter-torque stator 8b is fixedly arranged inside the at least one transverse duct 6 in order to support the at least one counter-torque rotor 8a rotatably. The counter-torque rotor 8a, the counter-torque stator 8b and the shroud 3, i.e. the transverse duct 6, illustratively define the at least one counter-torque device 8 of the helicopter 1, which is embodied in the form of a ducted tail rotor and, more specifically, in the form of a Fenestron® tail rotor. Accordingly, for simplicity and clarity, the counter-torque device 8 and, in particular, the counter-torque rotor 8a is hereinafter also referred to as the "ducted tail rotor".

The at least one ducted tail rotor 8a illustratively comprises a rotor hub 9 with a rotor axis and a plurality of rotor blades 10 that are attached to the rotor hub 9. The rotor blades 10 are preferably, but not necessarily, distributed in an angularly uneven manner on the rotor hub 9 using phase modulation. More specifically, phase modulation describes the technique of reshaping the noise-frequency spectrum, e.g. such that the geometric angular positions of the rotor blades 10 on the rotor hub 9 are distributed using the sinusoidal modulation law described in the document EP 0 680 871 A1, the teachings of which are incorporated herein by reference in its entirety into the present application.

The at least one counter-torque stator 8b illustratively comprises a drive shaft fairing 11 that is fixedly arranged inside the at least one transverse duct 6 and connects a gearbox fairing 12 to the shroud 3. The drive shaft fairing 11 is preferably adapted to receive a power transmission shaft of the at least one ducted tail rotor 8a. The gearbox fairing 12 is further connected to the shroud 3 by means of associated stator vanes (13 in FIG. 2). Preferably, the gearbox fairing 12 is adapted to receive a rotor drive transmission of the at least one ducted tail rotor 8a and can further by adapted to receive pitch variation mechanisms for the rotor blades 10.

Figure 2:
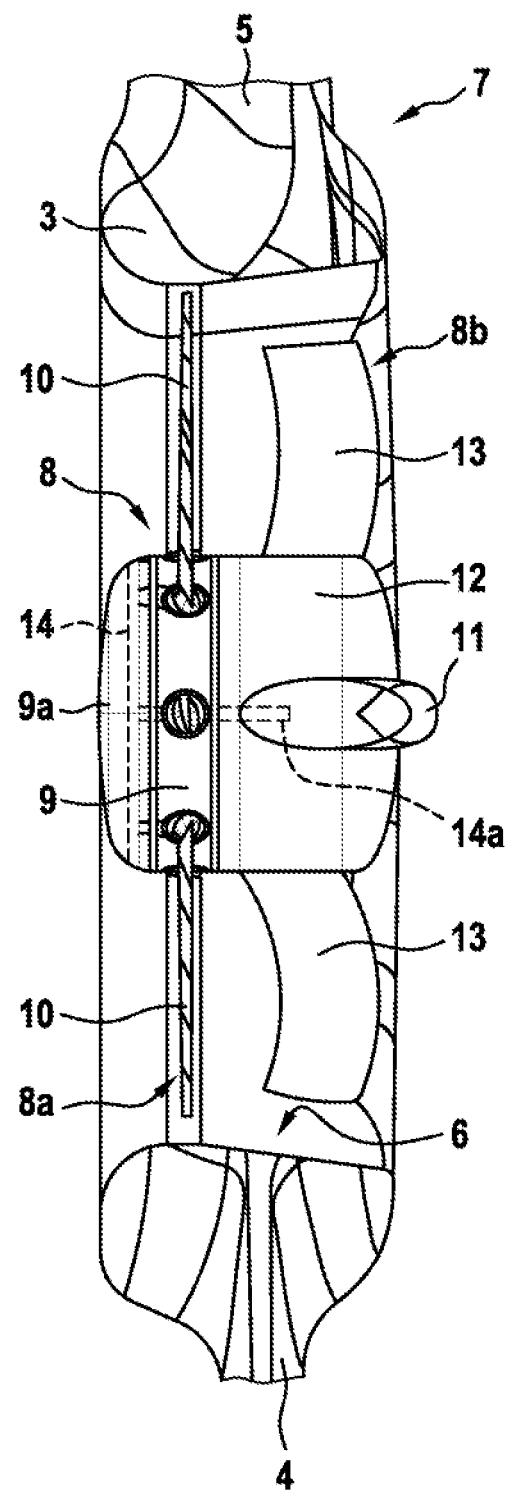
FIG. 2 shows a partially cut plan view of the ducted tail rotor of FIG. 1 with a pitch control device according to the invention.

FIG. 2 shows the duct-type portion 7 of FIG. 1 with the at least one ducted tail rotor 8a and the at least one counter-torque stator 8b, which are arranged in the at least one transverse duct 6 of the shroud 3. Preferably, the at least one ducted tail rotor 8a is arranged in close proximity to the at least one counter-torque stator 8b and, more specifically, upstream to the at least one counter-torque stator 8b with respect to an air flow generated by the ducted tail rotor 8a in operation.

The at least one ducted tail rotor 8a comprises the rotor blades 10 and the rotor hub 9, which is illustratively covered by a rotor hub cover 9a. The at least one counter-torque stator 8b comprises the drive shaft fairing 11 that is fixedly arranged inside the at least one transverse duct 6 and connects the gearbox fairing 12 to the shroud 3. The gearbox fairing 12 is connected to the shroud 3 by means of associated stator vanes 13.

According to one aspect, the ducted tail rotor 8a is provided with a pitch control device 14 that is preferably at least adapted for controlling collective pitch of the rotor blades 10. The pitch control device 14 is preferably actuatable by means of an associated pitch control shaft 14a which, in turn, is e.g. operated by the pitch variation mechanisms accommodated in the gearbox fairing 12.

Figure 3:
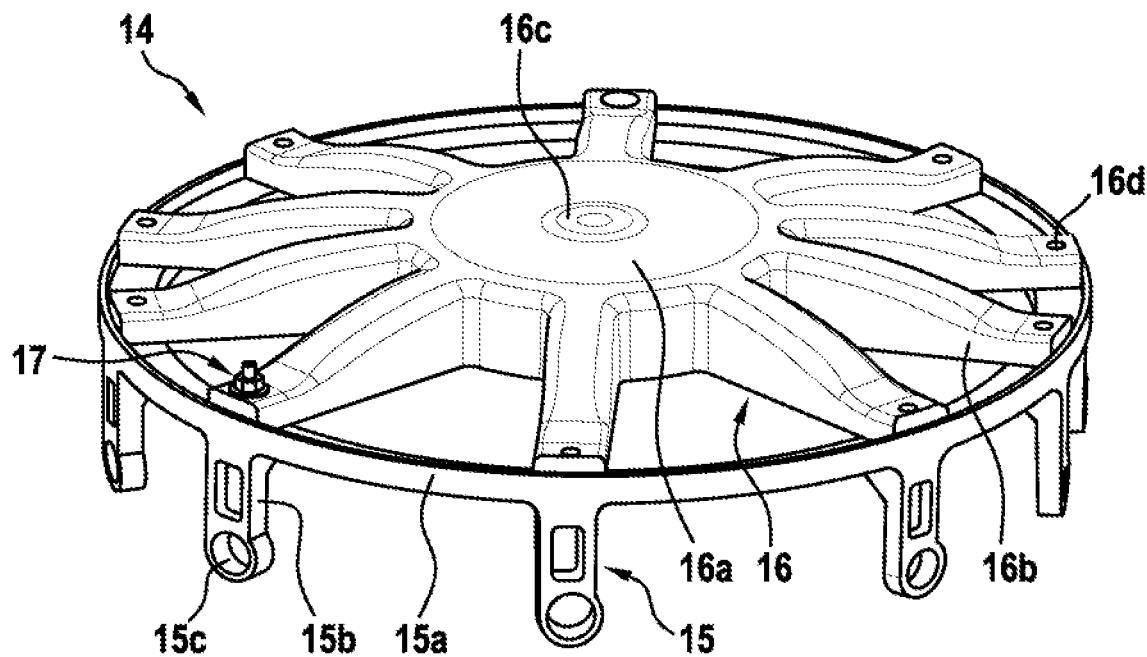
FIG. 3 shows a perspective view of the pitch control device of FIG. 2.

FIG. 3 shows the pitch control device 14 of FIG. 2, which is preferably at least adapted for use with the ducted tail rotor 8a of the rotorcraft 1 of FIG. 1. According to one aspect, the pitch control device 14 comprises at least a control transfer member 15 and a control input member 16.

Preferably, the control input member 16 comprises a composite material, and the control transfer member 15 comprises metal. The composite material preferably comprises carbon fiber reinforced polymer, and the metal preferably comprises aluminum. However, other composite materials and/or metals are likewise contemplated, as described by way of example above with respect to the composite material.

Figure 4:
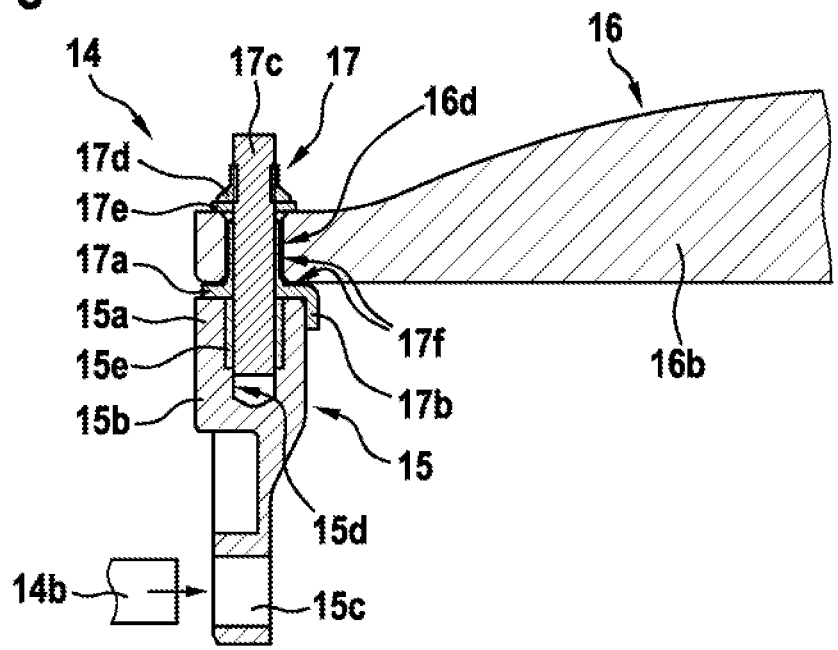
FIG. 4 shows a sectional view of a portion of the pitch control device of FIG. 3.

The control transfer member 15 is preferably provided for being coupled to associated pitch levers (14b in FIG. 4) of the rotor blades 10 of the ducted tail rotor 8a of FIG. 1 and FIG. 2, so that the control transfer member 15 may transfer pitch control movements of the pitch control device 14 to the associated pitch levers (14b in FIG. 4). Therefore, the control transfer member 15 preferably comprises at least two push rods 15b that are each coupled to a respectively associated pitch lever (14b in FIG. 4). More specifically, each push rod 15b exemplarily comprises a guide lug 15c for reception and accommodation of the respectively associated pitch lever (14b in FIG. 4).

By way of example, one push rod 15b is provided for each pitch lever (14b in FIG. 4) of each one of the rotor blades 10 of the ducted tail rotor 8a of FIG. 1 and FIG. 2. However, for simplicity and clarity of the drawings, only a single push rod is labelled with the reference sign 15b.

According to one aspect, the control transfer member 15 further comprises a ring-shaped connector 15a. Preferably, the ring-shaped connector 15a is embodied as a comparatively narrow ring with a width that is preferentially not more than two times greater than a corresponding thickness of the push rods 15b. The push rods 15b preferably extend axially from the ring-shaped connector 15a, which is preferentially rigidly attached to the control input member 16.

The control input member 16 is preferably provided for being mounted to the pitch control shaft 14a of the ducted tail rotor 8a of FIG. 1 and FIG. 2. Thus, the control input member 16 is directly moveable by means of the pitch control shaft 14a so that axial movements of the pitch control shaft 14a result in axial movements of the control input member 16, i.e. movements in direction of the rotation axis of the control input member 16. The latter entrains the control transfer member 15 into axial movements when being moved axially.

According to one aspect, the control input member 16 comprises a central component 16a, which is illustratively disc-shaped, and at least two connecting arms 16b that extend radially from the disc-shaped central component 16a. The disc-shaped central component 16a is preferably equipped with a mounting component 16c, preferentially a plastic mounting component, which is provided for being mounted to the pitch control shaft 14a of the ducted tail rotor 8a of FIG. 1 and FIG. 2.

Preferably, the disc-shaped central component 16a and the at least two connecting arms 16b define a spider-shaped structure. Illustratively, one connecting arm 16b is provided for each push rod 15b. Each connecting arm 16b is preferably provided with an attachment opening 16d for attachment to the control transfer member 15.

However, it should be noted that likewise differing numbers of push rods 15b and connecting arms 16b may be contemplated. Furthermore, it should be noted that, for simplicity and clarity of the drawings, only a single connecting arm is labelled with the reference sign 16b.

According to one aspect, the control input member 16 is rigidly attached, preferably in a releasable manner, to the control transfer member 15 using suitable attachment elements 17. More specifically, the connecting arms 16b of the control input member 16 are preferably rigidly attached to the ring-shaped connector 15a of the control transfer member 15 by means of the suitable attachment elements 17. This is further described below with reference to FIG. 4.

FIG. 4 shows a connecting arm 16b of the control input member 16 of FIG. 3, which is illustratively rigidly attached to the ring-shaped connector 15a of the control transfer member 15 of FIG. 3 by means of the suitable attachment elements 17 of FIG. 3. However, preferably each one of the connecting arms 16b of FIG. 3 is rigidly attached to the ring-shaped connector 15a in a similar manner, so that FIG. 4 should be understood as being representative for all these rigid attachments.

As described above, the connecting arm 16b is preferably rigidly attached to the ring-shaped connector 15a in the region of the push rod 15b. The latter is provided with the guide lug 15c for reception and accommodation of an associated pitch lever 14b.

Preferably, the ring-shaped connector 15a and the push rod 15b are both provided with a stud bolt accommodation 15d. The latter is exemplarily provided with a threaded insert 15e having a female thread or may, alternatively, be provided with a female thread as such. An associated fixation member, preferably a stud bolt 17c, is screwed into the threaded insert 15e and, thus, anchored at the ring-shaped connector 15a.

According to one aspect, the stud bolt 17c is bonded into the threaded insert 15e or into the female thread provided in the stud bolt accommodation 15d as such. Thus, the stud bolt 17c must not be loosened when disassembling the pitch control device 14 of FIG. 3 and, therefore, the female thread in the threaded insert 15e, or the female thread in the stud bolt accommodation 15d as such, is not worn out in operation. Furthermore, by bonding the stud bolt 17c into the threaded insert 15e or into the female thread provided in the stud bolt accommodation 15d as such, assembling of the control pitch device 14 of FIG. 3 can be simplified, as during assembly the control input member 16 can easily be positioned and held on the control transfer member 15 by means of the stud bold 17c.

The stud bolt 17c is exemplarily provided for rigidly attaching the ring-shaped connector 15a to the connecting arm 16b. According to one aspect, a bushing 17a is provided as interface between the connecting arm 16b and the ring-shaped connector 15a. The bushing 17a preferably comprises a flange 17b that centers the connecting arm 16b at the ring-shaped connector 15a. The bushing 17a is illustratively bonded to the connecting arm 16b by means of an associated adhesive layer 17f.

Preferably, the bushing 17a is at least partly accommodated in the attachment opening 16d of the connecting arm 16b and bonded to the connecting arm 16b by means of the associated adhesive layer 17f such that there is no direct contact between the bushing 17a and the connecting arm 16b. In other words, the bushing 17a, which preferably comprises metal, and the connecting arm 16b, which preferably comprises composite material, are separated from each other by the adhesive layer 17f which, thus, forms a barrier between the bushing 17a and the connecting arm 16b.

Illustratively, the bushing 17a accommodates the stud bolt 17c that is anchored at the ring-shaped connector 15a. The stud bolt 17c is preferably fixed at the connecting arm 16b by means of a nut 17d. Furthermore, by way of example, a washer 17e is provided. The bushing 17a, the stud bolt 17c, the nut 17d and the washer 17e illustratively form the suitable attachment elements 17.

Figure 5:
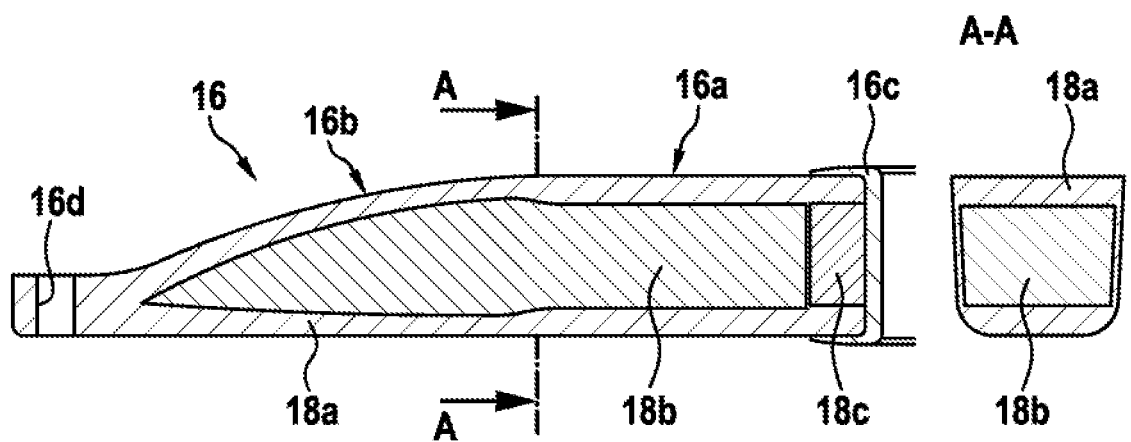
FIG. 5 shows a sectional view of a control input member of the pitch control device of FIG. 3 and FIG. 4.

FIG. 5 shows the control input member 16 of FIG. 3 with the disc-shaped central component 16a and the connecting arm 16b that is provided with the attachment opening 16d. The disc-shaped central component 16a is exemplarily provided with the plastic mounting component 16c.

According to one aspect, the disc-shaped central component 16a and the connecting arm 16b are formed with at least one cover layer 18a, which preferably comprises composite material, and an inner core element 18b, which is preferably realized as a foam core. Thus, the control input member 16 is according to one aspect at least partly formed as a sandwich component with a foam core (20c in FIG. 6), i.e. the inner core element 18b, that is embedded into at least one fiber-reinforced fabric layer (20d in FIG. 6), i.e. the at least one cover layer 18a.

The at least one cover layer 18a creates in the region of the attachment opening 16d preferably with added web layers a quasi-isotropic laminate which results in a strong lay-up to transmit a respective control loading in operation. Furthermore, the at least one cover layer 18a preferably also encompasses a spacer ring 18c, which preferentially also comprises composite material.

The spacer ring 18c preferably serves for rotatably bearing the plastic mounting component 16c. It should be noted that such a spacer ring 18c is more pressure resistant than the sandwich component as such. This pressure resistance is needed due to comparatively high clamping loads that occur when the control input member 16 is attached to the pitch control shaft 14a of FIG. 2.

Illustratively, the connecting arm 16b increases in thickness from its outer radial end, where the attachment opening 16d is located, towards the disc-shaped central component 16a. This increased thickness is beneficial for supporting an underlying moment distribution of the control input member 16 in operation, which linearly increases from the outer radial end of the connecting arm 16b towards the rotational center of the disc-shaped central component 16a. In fact, by increasing the thickness as illustrated, a disproportionately high increase of the stiffness of the connecting arm 16b is achieved, while its weight is only increased very slightly, as the density of the inner core element 18b, which is preferably realized as a foam core, is preferentially comparatively low.

Figure 6:
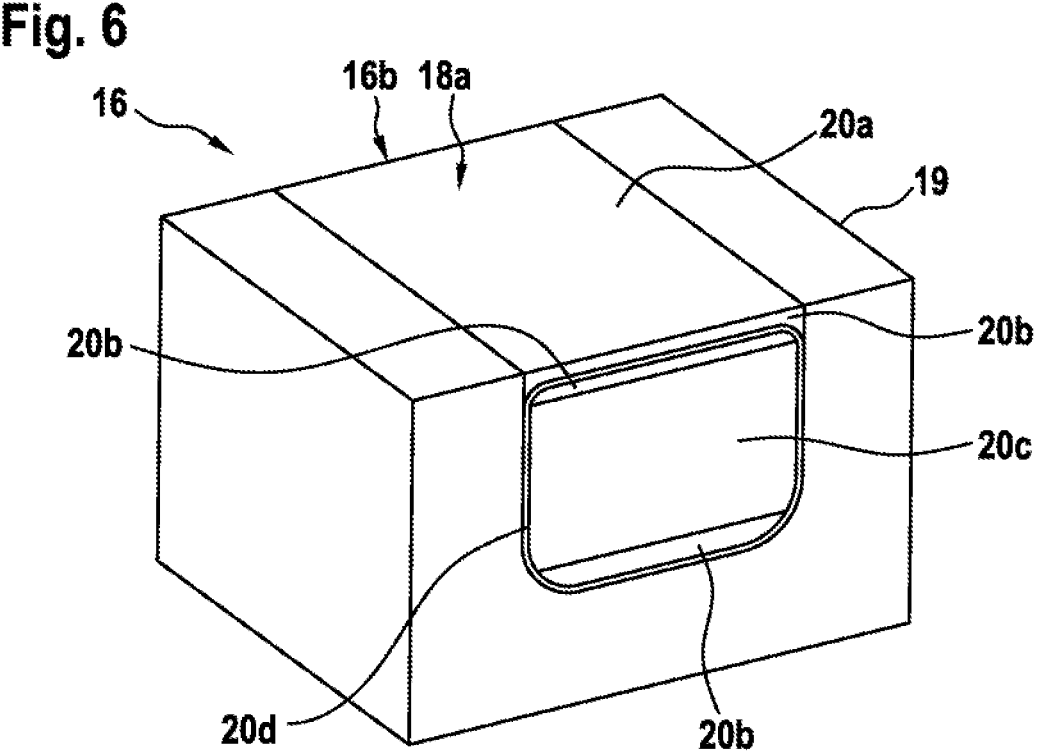
FIG. 6 shows a sectional view of a connecting arm of the control input member of FIG. 5 during manufacturing.

FIG. 6 shows a section of the connecting arm 16b of FIG. 5 in an associated tooling 19 upon manufacturing. The tooling 19 is merely representative for a suitable manufacturing tooling and, only illustratively, U-shaped.

The connecting arm 16b of FIG. 6 is embodied according to one aspect and illustratively comprises an upper fabric cover layer 20a, which exemplifies the cover layer 18a of FIG. 5. Below the upper fabric cover layer 20a, one or more unidirectional layers 20b are arranged. These unidirectional layers 20b in turn are arranged on top of a foam core 20c, which is surrounded by a surrounding fabric layer 20d. The latter illustratively also encases one or more unidirectional layers 20b that are arranged on top and/or below the foam core 20c.

It should be noted that manufacturing of such a composite component is a well-known measure to the person skilled in the art. Therefore, only exemplary manufacturing steps are representatively described hereinafter.

Figure 7:
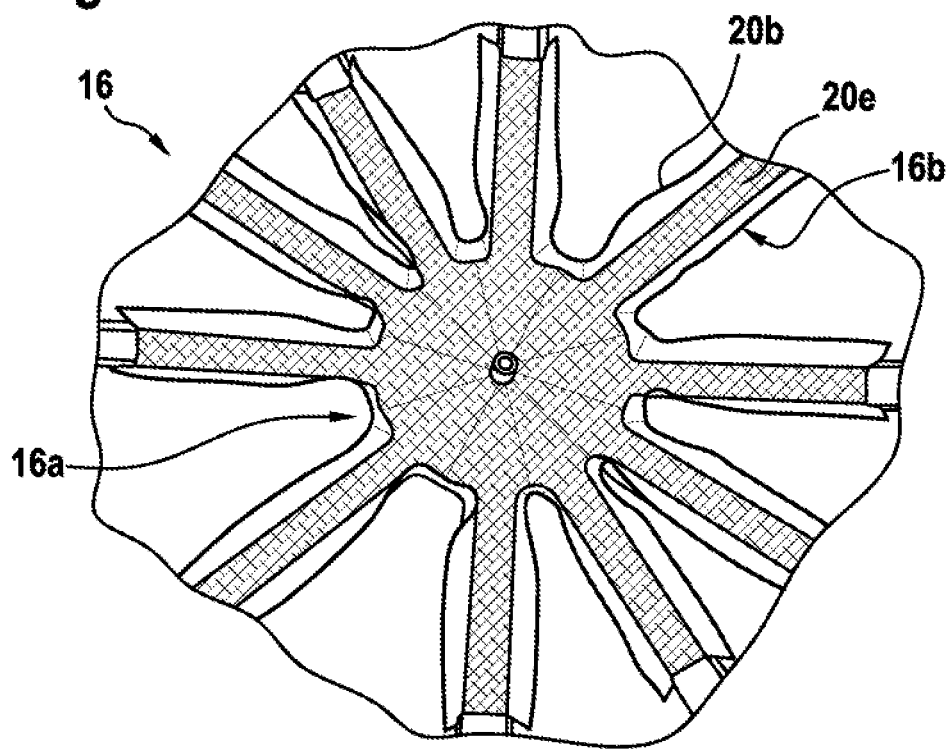
FIG. 7 shows initial manufacturing steps of a method of manufacturing the control input member of the pitch control device of FIG. 3 and FIG. 4.

FIG. 7 shows exemplary initial steps of a manufacturing process for manufacturing the control input member 16 with the disc-shaped central component 16a and the connecting arms 16b of FIG. 3 to FIG. 6. These initial steps are preferably performed using a tooling that is embodied on the basis of the tooling 19 of FIG. 6. Illustratively, the tooling merely consists of a plate-shaped component which is provided with a star- or spider-shaped recess.

According to one aspect, the manufacturing process starts with positioning the unidirectional layers 20b of FIG. 6 in the star- or spider-shaped recess. Furthermore, a protection film 20e is arranged on top of the unidirectional layers 20b.

Figure 8:
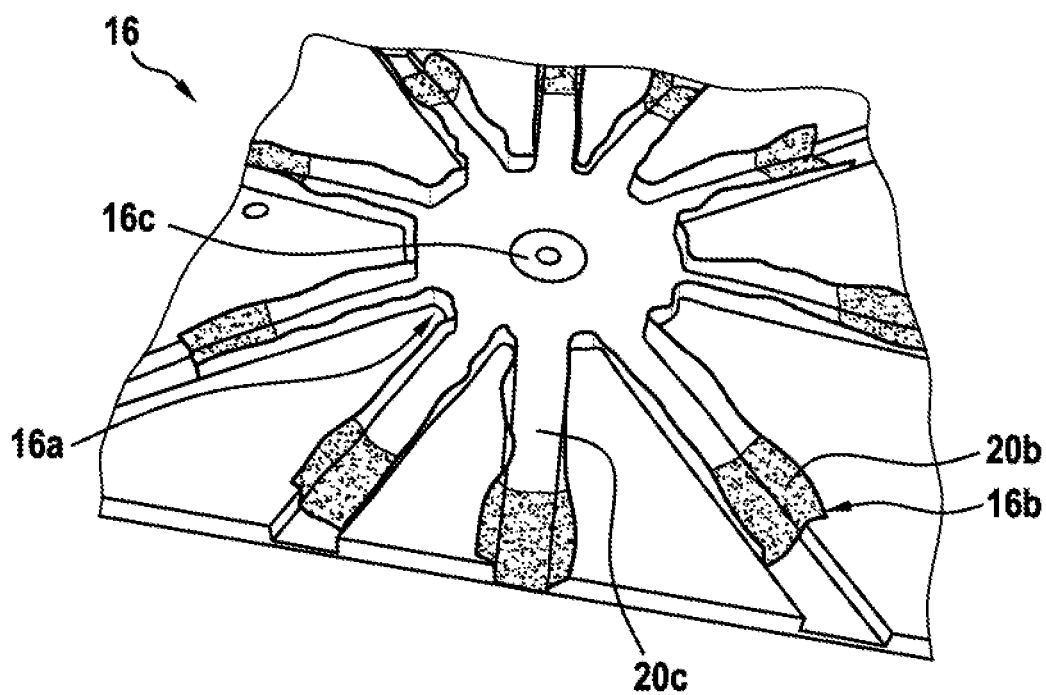
FIG. 8 shows subsequent manufacturing steps of a method of manufacturing the control input member of the pitch control device of FIG. 3 and FIG. 4.

FIG. 8 shows further exemplary steps of a manufacturing process for manufacturing the control input member 16 with the disc-shaped central component 16a and the connecting arms 16b of FIG. 3 to FIG. 6. These further steps are preferably performed after the initial steps described above with reference to FIG. 7.

According to one aspect, the manufacturing process continues with creating the foam core 20c of FIG. 6 on top of the unidirectional layers 20b of FIG. 6. Furthermore, the plastic mounting component 16c of FIG. 5 is arranged in the center of the disc-shaped central component 16a. Subsequently, preferably other unidirectional layers 20b are arranged on top of the foam core 20c.

However, it should be noted that the manufacturing process is only partly illustrated on the basis of a preferred manufacturing variant, as suitable manufacturing processes for manufacturing the control member 16 of FIG. 3 to FIG. 6 are readily available to the person skilled in the art as described above and, as such, not part of the present invention. Furthermore, it should be noted that multiple variations of the described manufacturing process are possible and, consequently, also contemplated. For instance, the thickness of the control input member 16, the number of unidirectional layers, the number of fabric cover layers etc. can e. g. be adapted on the basis of respective stiffness requirements and in an application specific manner dependent on an intended use of the control input member 16, and so on. Therefore, it should be noted that all such further modifications are also within the common knowledge of the person skilled in the art and, thus, also considered as being part of the present invention.

REFERENCE LIST 1 rotorcraft
1a main rotor
1b fuselage aft section
2 fuselage
2a tail boom
3 shroud
4 bumper
5 fin
5a tail wing
5b rudder
6 transverse duct
7 duct-type tail portion
8 counter-torque device
8a counter-torque rotor
8b counter-torque stator
9 counter-torque rotor hub
9a rotor hub cover
10 counter-torque rotor blades
11 drive shaft fairing
12 gearbox fairing
13 stator vanes
14 pitch control device
14a pitch control shaft
14b pitch lever or horn
15 control transfer member
15a ring connector
15b push rod
15c guide lug
15d stud bolt accommodation
15e threaded insert
16 control input member
16a central component
16b connecting arm
16c plastic mounting component
16d attachment opening
17 attachment element
17a attachment bushing
17b bushing flange
17c stud bolt
17d nut
17e washer
17f adhesive layer
18a cover layer
18b inner core element
18c spacer ring
19 tooling
20a fabric cover layer
20b unidirectional layers
20c foam core
20d surrounding fabric layer
20e protection film

What is claimed is:

1. A pitch control device for a ducted tail rotor of a rotorcraft, comprising:
a control input member with a disc-shaped central component and at least two connecting arms that extend radially from the disc-shaped central component, wherein the disc-shaped central component is provided for being mounted to an associated pitch control shaft of the ducted tail rotor, and
a control transfer member comprising a ring-shaped connector rigidly attached in a releasable manner to the at least two connecting arms of the control input member; the control transfer member comprising at least two push rods that extend axially from the ring-shaped connector, wherein each one of the at least two push rods is provided for being coupled to an associated pitch lever of a rotor blade of the ducted tail rotor;
wherein the at least two connecting arms of the control input member are rigidly attached to the ring-shaped connector of the control transfer member and the control input member comprises a composite material, the control transfer member comprising metal; and
wherein a bushing is provided as an interface between each one of the at least two connecting arms and the ring-shaped connector.

2. The pitch control device of claim 1,
wherein the disc-shaped central component and the at least two connecting arms define a spider-shaped structure.

3. The pitch control device of claim 1,
wherein the control input member is at least partly formed as a sandwich component with a foam core that is embedded into at least one fiber-reinforced fabric layer.

4. The pitch control device of claim 3,
wherein the disc-shaped central component of the control input member is equipped with a plastic mounting component that is provided for being mounted to the associated pitch control shaft of the ducted tail rotor.

5. The pitch control device of claim 1,
wherein the at least two connecting arms are rigidly attached to the ring-shaped connector by means of associated fixation members.

6. The pitch control device of claim 1,
wherein the composite material comprises carbon fiber reinforced polymer, and wherein the metal comprises aluminium.

7. The pitch control device of claim 1,
wherein each bushing is bonded to one of the at least two connecting arms by means of an associated adhesive layer.

8. The pitch control device of claim 7,
wherein each bushing comprises a flange that centers the one of the at least two connecting arms at the ring-shaped connector.

9. The pitch control device of claim 7,
wherein each bushing accommodates an associated stud bolt that is anchored at the ring-shaped connector.

10. The pitch control device of claim 9,
wherein each stud bolt is anchored at the ring-shaped connector in a threaded insert that is mounted to an associated accommodation provided in the ring-shaped connector.

11. The pitch control device of claim 10,
wherein each stud bolt is accommodated in an associated opening provided in the one of the at least two connecting arms and fixed at the one of the at least two connecting arms by means of a nut.

12. A pitch control device for a ducted tail rotor of a rotorcraft, the device comprising:
a control input member with a disc-shaped component and at least two connecting arms extending radially from the disc-shaped component, wherein the disc-shaped component is mountable to an associated pitch control shaft of the ducted tail rotor, and
a control transfer member comprising a ring-shaped connector releasably attached to the at least two connecting arms of the control input member; the control transfer member comprising at least two push rods extending axially from the ring-shaped connector, wherein each one of the at least two push rods is couplable to an associated pitch lever of a rotor blade of the ducted tail rotor;

wherein the at least two connecting arms of the control input member are attached to the ring-shaped connector of the control transfer member and the control input member comprises a composite material, the control transfer member comprising metal; and wherein a bushing is provided as an interface between each one of the at least two connecting arms and the ring-shaped connector, and each bushing is bonded to one of the at least two connecting arms by an associated adhesive layer.

13. The pitch control device of claim 12, wherein each bushing comprises a flange that centers the one of the at least two connecting arms at the ring-shaped connector.

14. The pitch control device of claim 12,
wherein the disc-shaped component and the at least two connecting arms define a spider-shaped structure.

15. The pitch control device of claim 12,
wherein the control input member is at least partly formed as a sandwich component with a foam core that is embedded into at least one fiber-reinforced fabric layer.

16. A pitch control device for a ducted tail rotor of a rotorcraft, the device comprising:
a control input member with a disc-shaped central component and at least two connecting arms extending radially from the disc-shaped central component, wherein the disc-shaped central component is mountable to an associated pitch control shaft of the ducted tail rotor, and
a control transfer member comprising a ring-shaped connector rigidly attached in a releasable manner to the at least two connecting arms of the control input member; the control transfer member comprising at least two push rods extending axially from the ring-shaped connector, wherein each one of the at least two push rods is couplable to an associated pitch lever of a rotor blade of the ducted tail rotor;

wherein the at least two connecting arms of the control input member are rigidly attached to the ring-shaped connector of the control transfer member and the control input member comprises a composite material, the control transfer member comprising metal; and wherein a bushing is provided as an interface between each one of the at least two connecting arms and the ring-shaped connector, and each bushing accommodates an associated stud bolt that is anchored at the ring-shaped connector.

17. The pitch control device of claim 16,
wherein each stud bolt is anchored at the ring-shaped connector in a threaded insert that is mounted to an associated accommodation provided in the ring-shaped connector.

18. The pitch control device of claim 16,
wherein each stud bolt is accommodated in an associated opening provided in the one of the at least two connecting arms and fixed at the one of the at least two connecting arms by means of a nut.

19. The pitch control device of claim 16,
wherein the disc-shaped central component and the at least two connecting arms define a spider-shaped structure.

20. The pitch control device of claim 16,
wherein the at least two connecting arms are rigidly attached to the ring-shaped connector by associated fixation members.

\* \* \* \* \*